US005571311A

United States Patent [19]
Belmont et al.

[11] Patent Number: 5,571,311
[45] Date of Patent: Nov. 5, 1996

[54] INK JET INK FORMULATIONS CONTAINING CARBON BLACK PRODUCTS

[75] Inventors: James A. Belmont, Acton, Mass.; Joseph E. Johnson, Nashua, N.H.; Curtis E. Adams, Andover, Mass.

[73] Assignee: Cabot Corporation, Boston, Mass.

[21] Appl. No.: 356,460

[22] Filed: Dec. 15, 1994

[51] Int. Cl.$^6$ .................................................. C09D 11/02
[52] U.S. Cl. .......................................... 106/20 R; 106/476
[58] Field of Search ............................. 106/20 R, 23 R, 106/476

[56] References Cited

U.S. PATENT DOCUMENTS

| T860,001 | 3/1969 | Gessler et al. | |
|---|---|---|---|
| 2,121,535 | 6/1938 | Amon | 106/473 |
| 2,156,591 | 5/1939 | Jacobson | 106/475 |
| 2,502,254 | 3/1950 | Glassman | 106/476 |
| 2,514,236 | 7/1950 | Glassman | 106/499 |
| 2,625,492 | 1/1953 | Young | 106/20 R |
| 2,793,100 | 5/1957 | Weihe | 106/472 |
| 2,833,736 | 5/1958 | Glaser | 106/20 R |
| 2,867,540 | 1/1959 | Harris | 106/472 |
| 3,011,902 | 12/1961 | Jordan | 106/477 |
| 3,025,259 | 3/1962 | Watson et al. | 260/47.5 |
| 3,043,708 | 7/1962 | Watson et al. | 106/476 |
| 3,335,020 | 8/1967 | Aboytes et al. | 106/476 |
| 3,479,300 | 11/1969 | Rivin et al. | 252/430 |
| 3,528,840 | 9/1970 | Aboytes | 106/473 |

(List continued on next page.)

FOREIGN PATENT DOCUMENTS

| 0006190 | 1/1980 | European Pat. Off. . |
|---|---|---|
| 272127 | 6/1988 | European Pat. Off. . |
| 433229 | 6/1991 | European Pat. Off. . |
| 0441987 | 8/1991 | European Pat. Off. . |
| 410152 | 2/1994 | European Pat. Off. . |
| 636591 | 2/1995 | European Pat. Off. . |
| 1164786 | 10/1958 | France . |
| 72775 | 4/1960 | France . |
| 1224131 | 4/1960 | France . |
| 1215895 | 4/1960 | France . |
| 1331889A | 7/1963 | France . |
| 2477593 | 11/1981 | France . |
| 2564489 | 11/1985 | France . |
| 2607528 | 6/1988 | France . |
| 2426266A | 12/1975 | Germany . |
| 3170748 | 7/1985 | Germany . |
| 59-82467 | 5/1984 | Japan . |
| 01275666 | 11/1989 | Japan . |
| 05271365 | 10/1993 | Japan . |
| 5339516 | 12/1993 | Japan . |
| 06025572 | 2/1994 | Japan . |
| 6025572 | 2/1994 | Japan . |
| 6073235 | 3/1994 | Japan . |
| 6067421 | 3/1994 | Japan . |
| 862018 | 3/1961 | United Kingdom . |
| 1191872 | 5/1970 | United Kingdom . |
| WO91/15425 | 10/1991 | WIPO . |
| WO92/13983 | 8/1992 | WIPO . |

OTHER PUBLICATIONS

S. Wolff et al., "The Influence of Modified carbon Blacks on Viscoelastic Compound Properties" Kautschuk & Gummi, Kunststoffe 44, Jahrgang, Nr. Oct. 1991, pp. 941–947.

C. Bourdillon, "Immobilization of glucose oxidase on a carbon surface derivatized by electrochemical reduction of diazonium salts" J. Electroanal. Chem., 336 (1992) 113–123, (no month available).

S. E. Moschopedis et al., "The Reaction of Diazonium Salts with Humic Acids and Coals: Evidence for Activated Methylene Bridges in Coals and Humic Acids" Fuel 43 (4) at pp. 289–298 (1964), (no month available).

Ullmann's Encyclopedia of Industrial Chemistry, vol. A8, pp. 508–509 (no date available).

J. B. Donnet et al., "Chimie Superficielle Et Sites Priviléqiés Des Charges Fines" Conference presentee aux Journees du Caoutehoue, Conference Internationale des Arts Chimiques, 22–23, pp. 5–12, (Jun. 1959).

V. A. Garten et al., "Nature Of Chemisorptive Mechanisms In Rubber Reinforcement", Commonwealth Scientific and Industrial Research Organ., Div. Of Industrial Chem., Melbourne, Australia, pp. 596–609, no date available.

J. W. Watson, "Chemical Aspects Of Reinforcement", Compounding Research Dept., Dunlop Research Center, Dunlop Rubber Co., pp. 987–999, no date available.

K. Ohkita, et al., "The Reaction Of Carbon Black Surface With 2,2–Diphenyl–1–picrylhydrazyl", CAR, vol. 10, No. 5, (Mar. 1972) pp. 631–636.

M. L. Studebaker et al., "Oxygen–Containing Groups On The Surface Of Carbon Black", Industrial and Eng. and Chem., vol. 48, No. 1, pp. 162–166, no date available.

T. Yamaguchi et al., "Novel Carbon Black/Rubber Coupling Agent", Kautschuk and Gummi, Kunststoffe 42, Jahrgang Nr. May 1989, pp. 403–409.

J. B. Donnet et al., "Aroxylic Structure Of The Quinone Groups And Of The Free Radicals Present On Carbon Black Surfaces", Rev. Gen. Caotchous Plasticques, vol. 42, No. 3, (1965), pp. 389–392. (w/Abstract), no month available.

J. B. Donnet et al., "Radical Reactions And Surface Chemistry Of Carbon Black", Bull. Soc. Chim. (1960) (Abstract only), no month available.

(List continued on next page.)

Primary Examiner—Helene Klemanski

[57] ABSTRACT

There is disclosed an aqueous ink jet ink composition comprising an aqueous vehicle and a carbon black product having attached at least one organic group. The organic group comprises a) at least one aromatic group and b) at least one ionic group, at least one ionizable group, or a mixture of an ionic group and an ionizable group. The organic group is directly attached to the carbon black by an aromatic group. Also disclosed is an aqueous ink jet ink composition comprising an aqueous vehicle and a carbon black product having attached at least one organic group. The organic group comprisies a) at least one $C_1$–$C_{12}$ alkyl group group and b) at least one ionic group, at least one ionizable group, or a mixture of an ionic group and an ionizable group. The organic group is directly attached to the carbon black by an alkyl group. Ink jet recording methods applying an ink jet ink of the present invention are also described.

25 Claims, No Drawings

U.S. PATENT DOCUMENTS

| | | | |
|---|---|---|---|
| 3,607,813 | 9/1971 | Purcell | 106/20 R |
| 3,674,670 | 7/1972 | Erikson et al. | 428/411.1 |
| 3,686,111 | 8/1972 | Makhlouf et al. | 524/530 |
| 3,846,141 | 11/1974 | Ostergren et al. | 106/22 R |
| 3,876,603 | 4/1975 | Makhlouf | 106/472 |
| 4,003,751 | 1/1977 | Carder | 106/20 R |
| 4,006,031 | 2/1977 | Ferch et al. | 106/473 |
| 4,014,833 | 3/1977 | Story | 106/20 R |
| 4,014,844 | 3/1977 | Vidal et al. | 106/472 |
| 4,061,830 | 12/1977 | Greenberg | 428/469 |
| 4,176,361 | 11/1979 | Kawada et al. | 106/22 R |
| 4,204,871 | 5/1980 | Johnson et al. | 106/20 R |
| 4,204,876 | 5/1980 | Bowden | 106/474 |
| 4,290,072 | 9/1981 | Manusukhani | 106/20 R |
| 4,293,394 | 10/1981 | Darlington et al. | 205/524 |
| 4,308,061 | 12/1981 | Iwahashi et al. | 106/22 H |
| 4,328,041 | 5/1982 | Wilson | 106/472 |
| 4,442,256 | 4/1984 | Miller | 524/539 |
| 4,451,597 | 5/1984 | Victorius | 524/39 |
| 4,476,270 | 10/1984 | Brasen et al. | 524/364 |
| 4,478,905 | 10/1984 | Neely, Jr. | 428/324 |
| 4,503,174 | 3/1985 | Vasta | 523/439 |
| 4,503,175 | 3/1985 | Houze et al. | 524/39 |
| 4,525,521 | 6/1985 | Denhartog | 524/517 |
| 4,525,570 | 6/1985 | Blum et al. | 528/75 |
| 4,530,961 | 7/1985 | Nguyen et al. | 106/20 R |
| 4,544,687 | 10/1985 | Schupp et al. | 523/414 |
| 4,555,535 | 11/1985 | Bednarek et al. | 524/40 |
| 4,556,427 | 12/1985 | Lewis | 106/20 R |
| 4,597,794 | 7/1986 | Ohta et al. | 106/20 D |
| 4,605,596 | 8/1986 | Fry | 428/423.3 |
| 4,620,993 | 11/1986 | Suss et al. | 427/407.1 |
| 4,620,994 | 11/1986 | Suss et al. | 427/407.1 |
| 4,650,718 | 3/1987 | Simpson et al. | 428/413 |
| 4,659,770 | 4/1987 | Vasta | 524/553 |
| 4,665,128 | 5/1987 | Cluff et al. | 525/131 |
| 4,680,204 | 7/1987 | Das et al. | 427/407.1 |
| 4,681,811 | 7/1987 | Simpson et al. | 428/413 |
| 4,692,481 | 9/1987 | Kelly | 523/219 |
| 4,710,543 | 12/1987 | Chattha et al. | 525/161 |
| 4,713,427 | 12/1987 | Chattha et al. | 525/110 |
| 4,719,132 | 1/1988 | Porter, Jr. | 427/409 |
| 4,727,100 | 2/1988 | Vasta | 524/40 |
| 4,741,780 | 5/1988 | Atkinson | 106/300 |
| 4,752,532 | 6/1988 | Starka | 428/482 |
| 4,764,430 | 8/1988 | Blackburn et al. | 428/413 |
| 4,770,706 | 9/1988 | Pietsch | 106/24 R |
| 4,789,400 | 12/1988 | Sciodar et al. | 106/22 H |
| 4,798,745 | 1/1989 | Martz et al. | 427/407.1 |
| 4,798,746 | 1/1989 | Claar et al. | 427/407.1 |
| 4,808,656 | 2/1989 | Kania et al. | 524/512 |
| 4,820,751 | 4/1989 | Takeshita et al. | 523/215 |
| 4,840,674 | 6/1989 | Schwarz | 106/22 R |
| 4,853,037 | 8/1989 | Johnson et al. | 106/22 R |
| 4,883,838 | 11/1989 | Jung et al. | 525/119 |
| 4,908,397 | 3/1990 | Barsotti et al. | 523/400 |
| 4,914,148 | 4/1990 | Hille et al. | 524/507 |
| 4,927,868 | 5/1990 | Schimmel et al. | 523/439 |
| 4,975,474 | 12/1990 | Barsotti et al. | 523/400 |
| 4,994,520 | 2/1991 | Mori et al. | 106/20 R |
| 5,008,335 | 4/1991 | Pettit, Jr. | 525/111 |
| 5,017,435 | 5/1991 | Barsotti et al. | 428/502 |
| 5,026,755 | 6/1991 | Kveglis et al. | 524/389 |
| 5,051,464 | 9/1991 | Johnson | 524/555 |
| 5,064,719 | 11/1991 | Den Hartog et al. | 428/411.1 |
| 5,066,733 | 11/1991 | Martz et al. | 524/455 |
| 5,076,843 | 12/1991 | Acitelli et al. | 106/22 R |
| 5,093,391 | 3/1992 | Barsotti et al. | 523/400 |
| 5,093,407 | 3/1992 | Komai et al. | 524/495 |
| 5,100,470 | 3/1992 | Hindagolla et al. | 106/22 H |
| 5,106,417 | 4/1992 | Hauser et al. | 106/20 R |
| 5,109,055 | 4/1992 | Inui et al. | 524/571 |
| 5,114,477 | 5/1992 | Mort et al. | 106/20 R |
| 5,122,552 | 6/1992 | Johnson | 523/454 |
| 5,130,004 | 7/1992 | Johnson et al. | 204/181.7 |
| 5,130,363 | 7/1992 | Scholl et al. | 524/392 |
| 5,141,556 | 8/1992 | Matrick | 106/20 R |
| 5,152,801 | 10/1992 | Altermah et al. | 106/473 |
| 5,159,009 | 10/1992 | Wolff et al. | 524/495 |
| 5,168,106 | 12/1992 | Babcock et al. | 524/495 |
| 5,173,111 | 12/1992 | Krishnan et al. | 106/20 R |
| 5,179,191 | 1/1993 | Jung et al. | 528/272 |
| 5,182,355 | 1/1993 | Martz et al. | 528/75 |
| 5,184,148 | 2/1993 | Suga et al. | 106/20 R |
| 5,190,582 | 3/1993 | Shinozuka et al. | 106/20 D |
| 5,200,164 | 4/1993 | Medalia et al. | 106/478 |
| 5,204,404 | 4/1993 | Werner, Jr. et al. | 524/501 |
| 5,206,295 | 4/1993 | Harper et al. | 525/207 |
| 5,221,581 | 6/1993 | Palmer et al. | 428/425.8 |
| 5,229,452 | 7/1993 | Green et al. | 524/415 |
| 5,232,974 | 8/1993 | Branan, Jr. et al. | 524/495 |
| 5,236,992 | 8/1993 | Bush | 524/495 |
| 5,242,751 | 9/1993 | Hartman | 428/324 |
| 5,266,361 | 11/1993 | Schwarte et al. | 427/407.1 |
| 5,266,406 | 11/1993 | Den Hartog et al. | 428/423.1 |
| 5,276,097 | 1/1994 | Hoffmann et al. | 525/167 |
| 5,281,261 | 1/1994 | Lin | 106/20 R |
| 5,286,286 | 2/1994 | Winnik et al. | 106/21 A |
| 5,288,788 | 2/1994 | Shieh et al. | 524/495 |
| 5,290,848 | 3/1994 | Palmer et al. | 524/517 |
| 5,302,197 | 4/1994 | Wickramanayke et al. | 106/22 A |
| 5,310,778 | 5/1994 | Shor et al. | 106/20 D |
| 5,314,945 | 5/1995 | Nickle et al. | 524/507 |
| 5,314,953 | 5/1994 | Corcoran et al. | 525/123 |
| 5,319,044 | 6/1994 | Jung et al. | 526/279 |
| 5,320,738 | 6/1994 | Kaufman | 205/317 |
| 5,324,790 | 6/1994 | Manring | 525/329.9 |
| 5,334,650 | 8/1994 | Serdiuk et al. | 524/591 |
| 5,336,719 | 8/1994 | Kappes et al. | 525/23 |
| 5,336,753 | 8/1994 | Jung et al. | 528/335 |
| 5,352,289 | 10/1994 | Weaver et al. | 106/476 |
| 5,356,973 | 10/1994 | Taljan et al. | 524/314 |
| 5,366,828 | 11/1994 | Struthers | 429/101 |
| 5,401,313 | 3/1995 | Supplee et al. | 106/476 |

OTHER PUBLICATIONS

RAPRA Abstract 432845: Compounding Heat Resistant Non–Black EPDM Rubber, PPG Industries, Dec. 1990.

RAPRA Abstract 417612, D. C. Edwards, "Review: Polymer–Filler Interactions In Rubber Reinforcement", J. Mat. Sci., vol. 25, No. 10, Oct. 1990, pp. 4175–4185.

Gregory, Peter, "Ink Jet Printing", High–Technology Applications of Organic Colorants, Chapter 9, (1991), no month available.

RAPRA Abstract 403202, D. Siller, "Organotitanate, Zirconate Effect On Elastomers", Rubb. Plast. News, vol. 19, No. 24, pp. 14–27, Jun. 1990.

RAPRA Abstract 390600, H. Okamoto, "Application Of Coupling Agents To Elastomers", Nippon Gomu Kyokaishi, vol 62, No. 12, (1989) pp. 819–833, no month.

RAPRA Abstract 394030, P. Flink et al., "Mechanical Properties Of Natural Rubber/Grafted Cellulose Fibre Composites", Brit. Polym. J., vol. 22, No. 2, 1990, pp. 147–153, no month available.

Tsubokawa et al., "Grafting Onto Carbon Black Having Few Functional Group" Shikizai Kyokaisha, vol. 66, No. 5, (1993) (Abstract Only), no month available.

R. H. Leach et al., "The Printing Processes", The Printing Ink Manual, Chapter 2, Fourth Edition, 1988, no month available.

R. H. Leach et al., "Gravure Inks", The Printing Ink Manual, Chapters 8–10, Fifth Edition (1988), no month available.

N. Tsubokawa, "Functionalization Of Carbon Black By Surface Grafting Of Polymers", Dept. Of Material and Chemical Eng., pp. 417–470, 1992, no month available.

"Ink Jet Printing": 1994 Overview and Outlook Supplied, Chapter 7, no date available.

Andreattola, Ink Jet Ink Technology, pp. 533–534, no date available.

Major, Michael J., "Formulating The Future of Automotive Coatings", Modern Paint and Coatings, pp. 34–36, (1992), no month available.

Greenfield, David, "Fever Formulation Options Lead to Emphasis on Familiar", Modern Paint and Coatings, pp. 40–42, (1992), no month available.

Schrantz, Joe, "Autopmotive Coatings", Modern Paint and Coatings pp. 22–31, (1994), no month available.

"Regulations Focus Formulator Attention on Additives", Modern Paint and Coatings, pp. 32–36, (1994), no month available.

Sherrer, Robert, "Coloration Of Ink Jet Inks", BLS Ink Jet Printing Conference, Oct. 10–12, (1994), Monterey CA.

Allen, Ross, "Thermal Ink Jet Printing Trends and Advances", BLS Ink Jet Printing Conference, Oct. 10–12, (1994), Monterey, CA.

Schneider, John, "Continuous Ink Jet", BLS Ink Jet Printing Conference Oct. 10–12 (1994) Monterey, CA.

Abstract 388935, R. Mushack, "Light–Colored Fillers In Polymers", Gummi Fas. Kinst., vol. 42, No. 11, (1989), pp. 584–592, no month available.

Abstract 301034, J. Y. Germain et al., "Carbon Black Is Better With Silica" Rubb. World, vol. 193, No. 1, pp. 51–54, Oct. 1985.

Abstract 343229, "White And Black Fillers For Rubber Compounds", Ind.d. Gomma, vol. 30, No. 12, pp. 23–54, Dec. 1986.

Abstract 177481, L. Corbelli, "Ethylene–Propylene Rubber", London Applied Science Publishers Ltd., (1981) Chapter 4, pp. 87–129, no month available.

Abstract 105623, G. Sugerman et al., "Putting Performance Into Thermosets With Titanium Coupling Agents", Cleveland, Ohio, pp. 106–113, Oct. 1976.

Abstract 056893, M. W. Ranney et al., "Applications For Silane Coupling Agents In The Automotive Industry", Kaut. U. Gummi Kunst., vol. 28, No. 10, pp. 597–608, Oct. 1975.

Abstract 002608, H. E. Haxo et al., "Ground Rice Hull Ash As A Filler For Rubber", Philadelphia, Paper No. 8, (1974), p. 41, Preprint .012, no month available.

Abstract 000937, G. M. Cameron et al., "Reduction Of Hear Build–Up In Mineral–Filled Elastomers Through The Use Of Silane Coupling Agents", Gothenburg, (44) (1973) Ser. Sec. 012, no month available.

Abstract 86056110, "Putting Performance Into Thermosets With Titanium Coupling Agents", G. Sugerman et al., High Performance Plast. National Tech. Conference, Soc. Plast. Eng, 1976, no month available.

J. Am. Chem. Soc. 1992, 114, 5883–5884 (no month available).

H. Zoheidi et al., "Role Of Oxygen Surface Groups In Catalysts Of Hydrogasification Of Carbon Black By Potassium Carbonate," Carbon vol. 25, No. 6, (1987), pp. 809–819, no month available.

J. D. Roberts et al., "Basic Principles Of Organic Chemistry," p. 1080, no date available.

Derwent Publications Ltd., Database WPI Week 8002, AN 80–03330C; SU,A,659 523, Apr. 1979, Abstract.

Derwent Publications Ltd., Database WPI Week 9423, An 94–189154; JP 61–28517A, May 1994, Abstract.

Derwent Publications Ltd., Database WPI Week 9524, AN 95–183086; JP,A,07 102 116, Apr. 1995, Abstract.

Patent Abstracts of Japan, vol. 95, No. 4, JP,A,07 102116, Apr. 1995, Abstract.

Derwent Publications Ltd., Database WPI Week 8651, AN 86–335147; JP 61–250 042, Nov. 1986, Abstract.

PCT International Search Report, Application No. PCT/US 95/16195 Mailing Date: Apr. 19, 1996.

PCT International Search Report, Application No. PCT/US 95/16452, Mailing Date: Apr. 17, 1996.

PCT International Search Report, Application No. PCT/IB 95/01154, Mailing Date: Apr. 29, 1996.

PCT International Search Report, Application No. PCT/US 95/16281, Mailing Date: Apr. 26, 1996.

Derwent Publications Ltd., Database WPI Week 8214, And 82–28019E; SU,A,834 062, May 1981, Abstract.

INK JET INK FORMULATIONS CONTAINING CARBON BLACK PRODUCTS

BACKGROUND OF THE INVENTION

1. Field of the Invention

This invention relates to aqueous ink formulations for ink jet printing which contain carbon black products as pigment.

2. Discussion of the Related Art

Ink jet printing is a non-impact process wherein droplets of ink are produced and deposited on a substrate such as paper, transparent film, or textile material in response to an electronic signal. Typical ink jet printing systems are continuous stream or drop-on-demand type. In continuous ink jet systems, ink is emitted in a continuous stream under pressure through at least one orifice or nozzle. The stream is perturbed causing it to break up into droplets at a fixed distance from the orifice. At the breakup point, the droplets are charged in accordance with digital data signals and passed through an electrostatic field. The field adjusts the trajectory of each droplet to direct it to a gutter for recirculation or to a specific location on a recording medium to create images. In drop-on-demand systems, a droplet is expelled from an orifice directly to a position on a recording medium by pressure generated in accordance with digital data signals. A droplet is not formed or expelled unless it is to be placed on the recording medium. The drop-on-demand system has several advantages over the continuous system in that it requires no ink recovery, charging, or deflection.

There are three basic types of drop-on-demand ink jet systems. One type has an ink filled channel with a nozzle on one end and a piezoelectric transducer near the other end which produces pressure pulses. The relatively large size of the transducer prevents close spacing of the nozzles, which may limit print quality. Physical limitations of the transducer result in low ink drop velocity and slow printing speed. The low drop velocity may also diminish tolerances for drop velocity variation and directionality.

A second type of drop-on-demand system is known as a thermal ink jet or bubble jet printer. The major components are an ink-filled channel with a nozzle at one end and a heat generating resistor near the nozzle. Printing signals create an electric current pulse in a resistive layer within each ink passageway, causing the ink in the immediate vicinity to evaporate, creating a bubble. Some of the ink in the channel is forced out through the orifice as a propelled droplet due to bubble expansion. Thermal or bubble ink jet printers produce high velocity droplets and allow very close spacing of nozzles, which results in a high quality of print.

The third type of drop-on-demand ink jet device is known as an acoustic ink printer. This printer utilizes a focused acoustic beam formed with a spherical lens illuminated by a plane wave of sound created by a piezoelectric transducer. The focused acoustic beam exerts pressure on the surface of the liquid, resulting in the ejection of small droplets of ink onto an imaging substrate.

Conventional inks for ink jet printers generally comprise a colorant such as dye which is soluble in a vehicle of water or a mixture comprising water and a water-soluble or water-miscible organic solvent. However, dyes have several disadvantages when used in ink jet inks. Dyes, being water-soluble or soluble in a water and organic mixture, may redissolve and run when exposed to moisture or water. Dye images may smear and rub off on contact with felt pen markers or upon being rubbed with a finger. Dyes also exhibit poor light stability, including fluorescence, sunlight, and ultraviolet light. Inks comprising soluble dyes may also exhibit clogging of the jetting channels due to solvent evaporation and changes in the dye's solubility, dye crystallization, and the presence of impurities. Dye-based ink may also exhibit poor thermal and chemical stability which could result in poor print quality. The dye may also bleed or diffuse into pores of the paper, thus causing poor print quality and low optical density of the image. Specialty paper may be necessary for certain ink jet inks containing a dye. In addition, many of the dyes contained in inks may be potentially mutagenic.

Pigments have also been used as colorants in ink jet inks, either as substitutes for, or in combination with, dyes. Pigments offer properties superior to dyes in areas such as waterfastness, lightfastness, image density, thermal stability, oxidative and chemical stability, compatibility with other colorants, and compatibility with both coated/treated and plain papers. Additionally, pigments are generally nonmutagenic. Pigments used in ink jet inks include carbon black, titanium dioxide white, cobalt blue ($CoO$—$Al_2O_3$), and chrome yellow ($PbCrO_4$). Carbon black, which absorbs in the infrared region, may be used for bar code reading.

The major problem with the use of such pigments is dispersion. Pigment particles such as carbon black generally start in a clumped or agglomerated state. To prepare ink jet inks, however, the carbon black must be dispersed and stabilized in that form because the extent of dispersion directly affects ink jet printing characteristics such as ejectability, print quality, optical density, and the like. Additionally, since the nozzle openings of thermal or bubble type ink jet printers are typically about 40–60 micrometers in diameter, it is critical to ensure that the ink jet ink does not clog or plug these openings. Thus, it is necessary to make the pigment particles as small as possible and preferably reduce the carbon black to individual aggregates. Small pigment particles are also less prone to settling during storage and therefore further contribute to the stability of the carbon black dispersion.

In light of these requirements, conventional aqueous pigment-based ink jet inks generally contain an aqueous ink vehicle, a pigment, a dispersant, and a humectant to prevent drying of ink or the clogging of orifices. Further additives such as biocides, binders, salts, driers, penetrants, surfactants, and the like may also be included.

Dispersants are materials that can bind to the pigment with one part of a molecule, while the other is attracted to the vehicle. A dispersant typically coats the pigment particles and then attracts a coating of the vehicle, which allows the coated particles to disperse in the vehicle. Clumping and agglomeration of the pigment particles are therefore minimized due to a steric or electro-steric repulsion caused by the protective coverage.

The conventional steps for preparing a pigment-based ink jet ink, as well known in the art, are as follows: First, the pigment must be milled to a small size in the presence of the solvent and the dispersant, by any of a variety of mechanical dispersion processes, including a liquid jet interaction chamber, a media mill, a ball mill, a roll-mill, a speed line mill, a homogenizer, and a sand grinder. Without the milling step, the dispersant will be ineffective. The pigment dispersion may be diluted further with the vehicle to obtain a desired concentration. Finally, some additional ink components, such as humectant, viscosity control additive, biocide, fungicide, pH adjuster, anti-corrosion agent, and the like, may be added to the pigment dispersion. Further dilution with the vehicle may also be made. It may also be necessary to remove larger particles by filtration and/or centrifugation.

For general discussion on the properties, preparation, and uses of aqueous inks, see *The Printing Manual,* 5th Ed., Leach et al., Eds. (Chapman & Hall, 1993).

The majority of time and cost is therefore spent on adequately dispersing the pigment in the aqueous medium. The desire to ease and improve dispersion of pigments is reflected in the patents discussed below.

U.S. Pat. No. 5,184,148 discloses an ink jet ink comprising an aqueous liquid medium containing acid carbon black and a water-soluble resin having a weight average molecular weight within the range of 3,000 to 30,000. The resin acts to improve the dispersion stability of the carbon black in the liquid medium. Other additives such as surfactants, defoaming agents, preservatives, dyes, and the like, may also be included.

U.S. Pat. No. 4,597,794 discloses an ink jet recording process which uses an ink prepared by dispersing fine particles of a pigment into an aqueous dispersion vehicle containing a polymer having both a hydrophilic and a hydrophobic construction portion. The hydrophilic portion constitutes a polymer of monomers having mainly polymerizable vinyl groups into which hydrophilic portions such as carboxylic acid groups, sulfonic acid groups, and sulfate groups have been included. Examples of the monomers to which hydrophilic groups are attached include styrene and its derivatives, vinylnaphthalene and its derivatives, and $\alpha,\beta$-ethylenic unsaturated carboxylate of a $C_8$–$C_{18}$ aliphatic alcohol. The hydrophobic portion of the polymer adsorbs to the pigment and the hydrophilic portion faces out from the pigment to bond with water or another aqueous solvent. This mechanism produces improved dispersion of the pigment. The ink compositions disclosed may also include additives such as surfactants, salts, resins, and dyes.

U.S. Pat. No. 4,530,961 discloses an aqueous dispersion of carbon black grafted with hydrophilic monomers of alkali or ammonium carboxylate bearing polyacrylates, which may be used for manufacturing ink jet inks. The carbon black is treated in water with a water-soluble peroxide, and after peroxidation, a water-soluble acrylic monomer and more peroxide are added. This process results in simultaneous homogeneous free radical polymerization of the monomer and grafting onto the carbon black. This composition may also contain surfactants, wetting agents, dyes, or other additives.

U.S. Pat. No. 5,281,261 discloses an ink containing carbon black particles having a polymeric vinyl aromatic salt either chemically grafted or adsorbed onto their surfaces. The salt may simply be adsorbed to the surface of the carbon black due to similar hydrophobicity of the carbon black and the aromatic groups of the salt. If the salt is grafted to the carbon black, it is not the aromatic portion of the salt which is directly grafted to the carbon black. Instead, a polymerizable olefinic group on the salt interacts with the carbon black to graft the salt thereon. Additionally, as with typical ink jet inks, additives such as surfactants, wetting agents, dyes, and the like, may be present.

The above U.S. Patents and article are incorporated herein by reference.

While the use of pigments such as carbon black in ink jet inks represents an alternative to dyes, there remains a need for a pigment that can be stably dispersed in its smallest particulate form without undue processing and cost.

SUMMARY OF THE INVENTION

The present invention relates to an aqueous ink jet ink composition comprising an aqueous vehicle and a carbon black product having attached at least one organic group. The organic group comprises a) at least one aromatic group and b) at least one ionic group, at least one ionizable group, or a mixture of an ionic group and an ionizable group. The organic group is directly attached to the carbon black by an aromatic group.

The present invention also relates to an aqueous ink jet ink composition comprising an aqueous vehicle and a carbon black product having attached at least one organic group. The organic group comprises a) at least one $C_1$–$C_{12}$ alkyl group and b) at least one ionic group, at least one ionizable group, or a mixture of an ionic group and an ionizable group. The organic group is directly attached to the carbon black by an aromatic group. The ink jet inks of this invention offer desirable dispersion stability, jetability, print quality, and image optical density.

The present invention additionally relates to an ink jet recording method having the step of applying to a recording medium ink droplets from orifices of an ink jet recording head, wherein the ink jet ink of the present invention is utilized.

DESCRIPTION OF THE PREFERRED EMBODIMENTS

The present invention relates to an aqueous ink jet ink composition comprising an aqueous vehicle and a carbon black product. In contrast to conventional carbon black pigments, the carbon black products for use in the ink jet ink of the present invention are not difficult to disperse in an aqueous vehicle. The carbon black products do not necessarily require a conventional milling process, nor are dispersants necessarily needed to attain a usable ink. Preferably, the carbon black products only require low shear stirring or mixing to readily disperse the pigment in water.

The carbon black products may be prepared by reacting a carbon black with a diazonium salt in a liquid reaction medium to attach at least one organic group to the surface of the carbon black. The diazonium salt may contain the organic group to be attached to the carbon black. According to the invention, a diazonium salt is an organic compound having one or more diazonium groups. Preferred reaction media include water, any medium containing water, and any medium containing alcohol. Water is the most preferred medium. These carbon black products and various methods for their preparation are described in a U.S. patent application entitled "Reaction of Carbon Black with Diazonium Salts, Resultant Carbon Black Products and Their Uses," filed Dec. 15, 1994, and incorporated herein by reference.

To prepare the above carbon black products, the diazonium salt need only be sufficiently stable to allow reaction with the carbon black. Thus, that reaction can be carried out with some diazonium salts otherwise considered to be unstable and subject to decomposition. Some decomposition processes may compete with the reaction between the carbon black and the diazonium salt and may reduce the total number of organic groups attached to the carbon black. Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes.

The carbon black can be reacted with a diazonium salt when present as a dilute, easily stirred, aqueous slurry, or in the presence of the proper amount of water for carbon black pellet formation. If desired, carbon black pellets may be formed utilizing a conventional pelletizing technology.

A preferred set of organic groups which may be attached to the carbon black are organic groups substituted with an ionic or an ionizable group as a functional group. An ionizable group is one which is capable of forming an ionic group in the medium of use. The ionic group may be an anionic group or a cationic group and the ionizable group may form an anion or a cation.

Ionizable functional groups forming anions include, for example, acidic groups or salts of acidic groups. The organic groups, therefore, include groups derived from organic acids. Preferably, when it contains an ionizable group forming an anion, such an organic group has a) an aromatic group or a $C_1$–$C_{12}$ alkyl group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers to the pKa of the organic group as a whole, not just the acidic substituent. More preferably, the pKa is less than 10 and most preferably less than 9. Preferably, the aromatic group or the $C_1$–$C_{12}$ alkyl group of the organic group is directly attached to the carbon black. The aromatic group may be further substituted or unsubstituted, for example, with alkyl groups. The $C_1$–$C_{12}$ alkyl group may be branched or unbranched and is preferably ethyl. More preferably, the organic group is a phenyl or a naphthyl group and the acidic group is a sulfonic acid group, a sulfinic acid group, a phosphonic acid group, or a carboxylic acid group. Examples include —COOH, —$SO_3H$ and —$PO_3H_2$, —$SO_2NH_2$, —$SO_2NHCOR$, and their salts, for example —COONa, —COOK, —COO$^{-NR_4^+}$, —$SO_3Na$, —$HPO_3Na$, —$SO_3^-NR_4^+$, and $PO_3Na_2$, where R is an alkyl (e.g., a $C_1$–$C_{20}$ alkyl) or phenyl group. Particularly preferred ionizable substituents are —COOH and —$SO_3H$ and their sodium and potassium salts. An example of the ionic or the ionizable group is an ethane sulfonic acid or a salt thereof.

Most preferably, the organic group is a substituted or unsubstituted sulfophenyl group or a salt thereof; a substituted or unsubstituted (polysulfo)phenyl group or a salt thereof; a substituted or unsubstituted sulfonaphthyl group or a salt thereof; or a substituted or unsubstituted (polysulfo)naphthyl group or a salt thereof. A preferred substituted sulfophenyl group is hydroxysulfophenyl group or a salt thereof.

Specific organic groups having an ionizable functional group forming an anion are p-sulfophenyl, 4-hydroxy-3-sulfophenyl, and 2-sulfoethyl.

Amines represent examples of ionizable functional groups that form cationic groups and can be attached to the same organic groups as discussed above for the ionizable groups which form anions. For example, amines may be protonated to form ammonium groups in acidic media. Preferably, an organic group having an amine substituent has a pKb of less than 5. Quaternary ammonium groups (—$NR_3^+$) and quaternary phosphonium groups (—$PR_3^+$) also represent examples of cationic groups and can be attached to the same organic groups as discussed above for the ionizable groups which form anions. Preferably, the organic group contains an aromatic group such as a phenyl or a naphthyl group and a quaternary ammonium or a quaternary phosphonium group. The aromatic group is preferably directly attached to the carbon black. Quaternized cyclic amines, and quaternized aromatic amines, can also be used as the organic group. Thus, N-substituted pyridinium compounds, such as N-methyl-pyridyl, can be used in this regard.

An advantage of the carbon black products having an attached organic group substituted with an ionic or an ionizable group is that the carbon black products may have increased water dispersibility relative to the corresponding untreated carbon black. In general, water dispersibility of the carbon black products increases with the number of organic groups attached to the carbon black having an ionizable group or the number of ionizable groups attached to a given organic group. Thus, increasing the number of ionizable groups associated with the carbon black products should increase their water dispersibility and permits control of the water dispersibility to a desired level. It can be noted that the water dispersibility of carbon black products containing an amine as the organic group attached to the carbon black may be increased by acidifying the aqueous vehicle.

Because the water dispersibility of the carbon black products depends to some extent on charge stabilization, it is preferable that the ionic strength of the aqueous medium be less than 0.1 molar. More preferably, the ionic strength is less than 0.01 molar.

When water dispersible carbon black products of the present invention are prepared, it is preferred that the ionic or ionizable groups be ionized in the reaction medium. The resulting product dispersion or slurry may be used as is or diluted prior to use. Alternatively, the carbon black products may be dried by techniques used for conventional carbon blacks. These techniques include, but are not limited to, drying in ovens and rotary kilns. Overdrying, however, may cause a loss in the degree of water dispersibility. In the event that the carbon black products above do not disperse in the aqueous vehicle as readily as desired, the carbon black products may be dipersed using conventionally known techniques such as milling or grinding.

Formation of an ink jet ink containing an aqueous vehicle and stably dispersed carbon black product as pigment can be performed with a minimum of components and processing steps when the above carbon black products are utilized. Such an ink may be used in any ink jet printer known in the art. Preferably, in ink jet inks of the present invention, the carbon black products are present in an amount of less than or equal to 20% by weight of the ink jet ink. Common additives such as those discussed below may be added to the dispersion to further improve the properties of the ink jet ink.

In particular, a humectant may be added to reduce the rate of evaporation of water in the ink to minimize clogging. If the ink begins to dry out, the humectant concentration increases and evaporation decreases further. Humectants may also affect other properties of the ink and prints made therefrom, such as viscosity, pH, surface tension, optical density, and print quality. Preferred humectants include ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, alcohol derivatives, carbitol, butyl carbitol, cellosolve, ether derivatives, amino alcohols, and ketones.

Biocides such as benzoate or sorbate salts are important in preventing bacterial growth. Bacteria are often larger than ink nozzles and can cause clogging and other problems. Binders attach to the substrate to hold the colorant on the paper. Examples include poly(vinyl alcohol), polyester, polyester-melamine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof. Drying accelerating agents promote evaporation of the ink once the ink is placed on the paper. These include sodium lauryl sulfate, N,N-diethyl-m-toluamide, cyclohexylpyrrolidinone, and butyl carbitol. Penetrants such as alcohols, sodium lauryl sulfate, esters, and ketones allow the ink to penetrate the surface of the paper. Alcohols may also be used to increase the rate of drying of the liquid ink. And surfactants like detergents and soap reduce the surface tension to allow the ink to spread on the substrate.

Additionally, the carbon black products-based ink jet inks may incorporate some dye to modify color balance and adjust optical density. Such dyes include food dyes, FD & C dyes, derivatives of phathalocyanine tetrasulfonic acids, including copper phthalocyanine derivatives, tetra sodium salts, tetra ammonium salts, tetra potassium salts, tetra lithium salts, and the like.

Polymers or oligomers may be added to ink jet inks based on the carbon black products. The images created from such an ink may be water-insoluble upon polymerization or cross-linking of the added polymers or oligomers.

Advantageously, the ink jet inks of the invention have excellent stability over time and a wide range of temperatures, have desirable viscosities and surface tensions, and when printed, have good optical density, print clarity, and rub resistance. The following examples are intended to illustrate, not limit, the claimed invention.

EXAMPLES

Procedures Used To Determine Ink Properties:
Surface Area:
BET nitrogen surface areas obtained according to ASTM D-4820 are used for surface area measurements. CTAB areas were obtained according to ASTM D-3765. DBPA data were obtained according to ASTM D-2414.
Surface Tension:
The surface tensions of the inks were measured using a CSC-DU NOUY Tensiometer, No. 70535 from CSC Scientific Co., Inc. Fairfax, Va., using the ASTM D 1331 and D 1590 procedures.
Viscosity:
The ink viscosities were measured using a Cannon-Fenske (Reverse-Flow) viscometer, from Cannon Instrument Co., State College, Pa., using ASTM procedures D 445 and D 446. A No. 1 shell cup from Norcross Corp., Newton, Mass. was also used to measure the viscosities of some of the inks using ASTM procedure D 4212. An excellent correlation between results of both procedures was found.
Particle Diameter:
The mean particle diameter and largest detectable diameter were measured using a MICROTRAC Ultrafine Particle Analyzer from Leeds & Northrup Co., St. Petersburg, Fla. The following conditions were used: non-transparent, non-spherical particles; particle density=1.86 g/m$^3$; with water as the dispersing liquid. A run time of six minutes was used. (MICROTRAC is a registered trademark of Leeds & Northrup Co.)
Optical Density:
The optical density of films, prepared by using a 3 mil Bird applicator to apply a liquid ink coating and then air drying the film, was measured using a MACBETH RD918 Densitometer from Macbeth, New Windsor, N.Y. following ANSI procedure CGATS.4-1993. The optical density was determined on Nashua xerographic, white paper, 20 #, uncoated stock from Nashua Corp., Nashua, N.H. (MACBETH is a registered trademark of Kollmorgen Instruments Corp.)
Print Quality:
Print quality is the sharpness of image (or characters) formed by the ink film on a substrate. The sharpness of the image, which includes being "non-fuzzy", "non-feathering", "non-bleeding", and "non-interrupting" of print, was determined by visual observation. Character alignment, skewness, adjacency, spacing, edge regularity, and non-extraneous ink all contribute to print quality. A relative rating scheme of 1 through 6 was established for prints made. In the visual rating scale, 1 represents the best print quality. All inks with ratings of 1 to 6 produce legible print.
Water-Resistance:
A qualitative test consisted of putting distilled water on the print and then rubbing with a tissue, and then visually observing the change in print quality and the ink on the tissue.

Example 1

Preparation of a Carbon Black Product

A solution of 43 g of sulfanilic acid in 2 L of water at about 75° C. was added to 202 g of a carbon black having a surface area of 230 m$^2$/g and a DBPA of 70 ml/100 g with stirring. The stirring mixture was allowed to cool to room temperature, and 26.2 g of concentrated nitric acid was added. A solution of 20.5 g of NaNO$_2$ in water was added. 4-Sulfobenzenediazonium hydroxide inner salt is formed, which reacts with the carbon black. The dispersion was stirred until the resulting bubbling stopped. After drying at 70° C., the product was washed with methanol and dried in an oven at 90° C. The product has attached p—$C_6H_4SO_3^-$ groups.

Example 2

Preparation of a Carbon Black Product

A pin pelletizer was charged with 42.4 g of sulfanilic acid and with 200 g of a carbon black having a CTAB surface area of 350 m$^2$/g and a DBPA of 120 ml/100 g. After mixing for 30 seconds, a solution of 17.4 g NaNO$_2$ in 150 g of boiling water was added and the mixture was pelletized for 45 seconds. 4-Sulfobenzenediazonium hydroxide inner salt is formed, which reacts with the carbon black. The product, which was then at 35° C. was dried in an oven at 120° C. The product had a 325 mesh residue of 0.2%, compared to 97% for the unreacted carbon black. The product has attached p—$C_6H_4SO_3^-$ groups.

Example 3

Preparation of a Carbon Black Product

This example illustrates the preparation of a carbon black product for use in the present invention. Sulfanilic acid (21 g) was dissolved in 1 L of water with warming. The solution was mixed with 100 g of a carbon black having a surface area of 230 m$^2$/g and a DBPA of 70 ml/100 g and allowed to cool to room temperature. An aqueous solution of 10 g NaNO$_2$ was added slowly and the resulting dispersion was stirred for two hours. 4-Sulfobenzenediazonium hydroxide inner salt is formed in situ, which reacts with the carbon black. The product was dried overnight in an oven at 70° C. The product has attached p—$C_6H_4SO_3^-$ groups.

Example 4

Preparation of a Carbon Black Product

Anthranilic acid (1.58 g) was added to a solution of 5.0 g concentrated HCl in 5.3 g of water at 5° C. A solution of 1.78 g of $NaNO_2$ in 8.7 g of water at 5° C. was added, keeping the temperature below 10° C. by stirring in an ice bath. After stirring for 15 minutes, the solution was added to a stirring suspension of 20 g of a carbon black having a surface area of 320 m²/g and a DBPA of 120 ml/100 g. After stirring for 15 minutes, the product was collected by filtration, washed twice with water and dried in an oven at 110° C. The product has attached o—$C_6H_4CO_2^-$ groups.

Example 5

Preparation of a Carbon Black Product

Silver nitrate (1.69 g) was added to a stirring solution of 3.08 g of $H_3NC_6H_4N(CH_3)_3Cl$ in 30 g of water. The precipitate was removed by filtration, and the remaining solution was added to a stirring suspension of 10.0 g of a carbon black having a surface area of 230 m²/g and a DBPA of 70 ml/100 g in 70 g of water. Concentrated HCl (2.25 g) was added and then a solution of 0.83 g $NaNO_2$ in 10 g of water was added. The diazonium salt $N_2C_6H_4N(CH_3)_3^{++}$ is formed in situ, which reacts with the carbon black. Bubbles are released. When the bubbling had stopped, the dispersion was dried in an oven at 120° C. The product had a 325 mesh residue of 0.6%, compared to 94% for the unreacted carbon black. The product has attached p—$C_6H_4N(CH_3)_3^+$ groups.

Example 6

Preparation of a Carbon Black Product

Sulfanilic acid (43 g) was dissolved in 2 L of water with warming. The solution was mixed with 200 g of a carbon black having a surface area of 230 m²/g and a DBPA of 70 ml/100 g and allowed to cool. An aqueous solution of 20.5 g $NaNO_2$ was added slowly and the resulting dispersion was stirred for one hour. 4-Sulfobenzenediazonium hydroxide inner salt was formed in situ, which reacted with the carbon black. The dispersion was filtered through a Whatman #41 filter, and the product was dried in an oven at 70° C. The product has attached p—$C_6H_4SO_3^-$ groups.

Example 7

Preparation of a Carbon Black Product

A solution of 17.0 g sulfanilamide and 24.7 mL of concentrated HCl in 100 mL of warm water was prepared. The solution was cooled in an ice bath and a solution of 7.49 g $NaNO_2$ in 20 mL of water was added over a period of several minutes. After stirring for 20 minutes, half of the diazonium solution was added to a stirring suspension of 50 g of carbon black having a surface area of 230 m²/g and a DBPA of 70 mL/100 g in 250 mL of water. Gas evolution is observed after about 5 minutes, and the suspension was stirred for three hours. The carbon black product is recovered by drying the dispersion in an oven at 125° C. The product has attached p—$C_6H_4SO_2NH_2$ groups.

Example 8

Preparation of an Ink Jet Ink

This example illustrates the preparation of an ink jet ink of the present invention. Sulfanilic acid (4.25 g) was dissolved in hot water and filtered while hot. Twenty five grams of a carbon black having a surface area of 230 m²/g and a DBPA of 70 ml/100 g was added, and the stirring mixture was cooled to 30° C. Concentrated HCl (5.33 g) was added and then 2.03 g of $NaNO_2$ dissolved in a small amount of water was added over a period of one hour. When bubbling was complete, the carbon black product in the dispersion had attached p—$C_6H_4SO_3^-$ groups. Water was then added to dilute the carbon black product concentration to 3 wt. %. The dispersion was subjected to centrifugation for 10 minutes at 1000 rpm and filtered through a 1.2 micron filter. The dispersion was concentrated in an oven until the carbon black product concentration reached 10 wt. %. The dispersion was refiltered through a 1.2 micron filter, and adjusted to pH 9 with the addition of NaOH solution. The median particle size of the carbon black product in the resulting ink jet ink was 0.06 microns. A sample of the ink that was diluted to a 5 wt. % carbon black content had a viscosity of 1.17 cP and a surface tension of 76.5 dynes/cm.

A sample of the ink that had been diluted to a 5 wt. % carbon black content and subjected to three freeze thaw cycles had a viscosity of 1.20 cP, and a surface tension of 76 dynes/cm. The carbon black product in this ink had a median particle size of 0.05 microns.

A sample of the ink that had been diluted to a 5 wt. % carbon black content and that was heated in a sealed container for one week at 70° C. had a viscosity of 1.13 cP, and a surface tension of 76 dynes/cm. The carbon black product in this ink had a median particle size of 0.06 microns.

Example 9

Preparation of Ink Jet Inks

Sulfanilic acid (34.3 g) is dissolved in 2 L of hot water. Two hundred grams of a carbon black having a surface area of 230 m²/g and a DBPA of 70 ml/100 g were added and the mixture was cooled to room temperature. Concentrated nitric acid (21.2 g) was added. A solution of 16.5 g $NaNO_2$ in 40 g water was added slowly. After stirring, the resulting dispersion, which contained a carbon black product having attached p—$C_6H_4SO_3^-$ groups, was filtered through a 1.2 micron filter. This dispersion was useful as an ink jet ink and was stable at room temperature for months. The carbon black product contained in the ink had a median particle size of <0.1 microns, Addition of an equal volume of a solution of 1.5% to 3% polyvinyl alcohol (99% hydrolyzed, MW 13000) in water to the ink jet ink give inks that made prints with improved dry rub resistance. The prints did not bleed when immersed in water for one minute, but they were not fast when rubbed in the wet state.

Examples 10–26

Preparation of Ink Jet Inks

These examples illustrate the preparation of ink jet inks of the present invention. Carbon black products were dispersed in water at the concentrations indicated. The pH was increased to about 9 with the addition of N,N dimethylethanolamine, except in Example 25, where the pH was adjusted to 12 with NaOH. Additives such as humectants, polymers or dyes were then added as indicated. The inks were filtered through a Fisher Q8 paper filer, a Whatman GMF-2 micron filter and then a Whatman GMF-1 micron filter to remove coarse contaminants. Prints were made from these inks with a commercial ink jet printer on xerographic uncoated white paper stock. These results show that a variety of humectants, polymers and dyes can be added to give useful ink jet inks with differing properties. Prints made from inks of Examples 23 and 24 had excellent wet rub resistance properties. Prints made from the ink of Example 25 had good wet rub resistance properties. Prints made from the ink of Example 26 had good wet rub resistance when the print was dried at room temperature and excellent wet rub resistance properties when the prints were dried at 200° C. for one minute.

| Example | Carbon Black Product of Example | Carbon Black Product Concentration % | Additive | Additive Concentration | ST | Visc (cP) | MD (um) | LD (um) | PQ | OD |
| --- | --- | --- | --- | --- | --- | --- | --- | --- | --- | --- |
| 10 | 1 | 10 | — | — | 68.5 | 1.28 | 0.09 | 0.41 | 5 | 1.17 |
| 11 | 2 | 5 | — | — | 74.7 | N/A | 0.19 | 0.69 | 5 | 1.00 |
| 12 | 1 | 10 | EG | 10 | 71.4 | 2.11 | 0.12 | 0.49 | 1 | 1.27 |
| 13 | 3 | 10 | PEG, MW 200 | 10 | 67.8 | N/A | 0.06 | 0.24 | 5 | 1.23 |
| 14 | 3 | 10 | PEG, MW 300 | 10 | 66.9 | N/A | 0.07 | 0.29 | 5 | 1.21 |
| 15 | 1 | 10 | PEG, MW 350 | 10 | 71.4 | N/A | 0.12 | 0.58 | 3 | 1.17 |
| 16 | 3 | 10 | PEG, MW 1000 | 10 | 66.5 | N/A | 0.07 | 0.24 | 2 | 1.23 |
| 17 | 3 | 10 | DEG | 10 | 68.8 | N/A | 0.06 | 0.20 | 2 | 1.24 |
| 18 | 1 | 15 | 2-Propanol | 10 | 42.6 | N/A | 0.11 | 0.41 | 5 | 1.10 |
| 19 | 4 | 4 | — | — | 74.5 | 1.04 | 0.27 | 1.16 | 6 | 0.18 |
| 20 | 1 | 10 | DB19 | 0.7 | 72.9 | 1.38 | 0.11 | 0.49 | 3 | 1.18 |
| 21 | 2 | 5 | DB19 | 1.0 | 73.4 | 1.14 | N/A | N/A | 4 | 1.06 |
| 22 | 1 | 10 | ACR | 10 | 48.1 | 2.29 | 0.13 | 0.52 | 2 | 0.99 |
| 23 | 5 | 10 | — | — | N/A | N/A | 0.10 | 0.29 | 4 | N/A |
| 24 | 5 | 10 | EG | 10 | N/A | N/A | N/A | N/A | 5 | N/A |
| 25 | 7 | 5 | — | — | 74.4 | 1.3 | 0.08 | 0.41 | 4 | 1.21 |
| 26 | 6 | 10 | PE/M/EG/PJB | 15/6/5/1 | 45.8 | 2.0 | 0.07 | 0.41 | 6 | 1.27 |

EG = ethylene glycol
PEG = polyethylene glycol
DEG = diethylene gycol
DB19 = direct black 19
ACR = JONCRYL 62 acrylic resin solution. JONCRYL is a registered trademark of Johnson Polymer, Racine WI.
PE = 072-7232 polyester solution, McWhorter Technologies, Chigago Heights, IL
M = 023-2347 Melamine, Cargill Inc, Forest Park, GA
PJB = Projet black 1 dye solution, Zeneca, Wilminton, DE
ST = surface tension (dynes/cm)
MD = mean diameter (um)
LD = largest detectable Diameter (um)
Visc = viscosity (cP)
PQ = Print Quality, Visual Rating
OD = optical density (Macbeth reflection densiometer)

What is claimed is:

1. An aqueous ink jet ink composition comprising an aqueous vehicle and a carbon black product having attached at least one organic group, the organic group comprising a) at least one aromatic group, and b) at least one ionic group, at least one ionizable group, or a mixture of an ionic group and an ionizable group, wherein at least one aromatic group of the organic group is directly attached to the carbon black.

2. A composition of claim 1 wherein the carbon black product is present in an amount of less than or equal to 20% by weight of the ink jet ink.

3. A composition of claim 1 wherein the aqueous vehicle is water.

4. A composition of claim 1 wherein the aqueous vehicle is water and a water-miscible solvent.

5. A composition of claim 1 further comprising a humectant.

6. A composition of claim 5 wherein the humectant is at least one compound selected from the group consisting of ethylene glycol, diethylene glycol, propylene glycol, glycerine, dipropylene glycols, polyethylene glycols, polypropylene glycols, amides, ethers, carboxylic acids, esters, alcohols, organosulfides, organosulfoxides, sulfones, alcohol derivatives, carbitol, butyl carbitol, cellosolve, ether derivatives, amino alcohols, and ketones.

7. A composition of claim 1 further comprising a binder.

8. A composition of claim 1 further comprising a dye.

9. A composition of claim 1 further comprising at least two additives selected from the group consisting of humectants, binders, dyes, biocides, penetrants, and surfactants.

10. A composition of claim 1 wherein the ionic or the ionizable group is a carboxylic acid or a salt thereof.

11. A composition of claim 1 wherein the ionic or the ionizable group is a sulfonic acid or a salt thereof.

12. A composition of claim 1 wherein the organic group is a sulfophenyl group or a salt thereof.

13. A composition of claim 1 wherein the organic group is p-sulfophenyl or a salt thereof.

14. A composition of claim 1 wherein the organic group is a carboxyphenyl group or a salt thereof.

15. A composition of claim 1 wherein the ionic or the ionizable group is a quaternary ammonium salt.

16. A composition of claim 1 wherein the ionic or the ionizable group is a sulfonamide or a salt thereof.

17. A composition of claim 1 wherein the ionic or the ionizable group has the formula —$SO_2NHCOR$ or a salt thereof, where R is a $C_1$–$C_{20}$ alkyl or a phenyl group.

18. A composition of claim 1 where the organic group has the formula p—$C_6H_4SO_2NH_2$.

19. An aqueous ink jet ink composition comprising an aqueous vehicle and a carbon black product having attached at least one organic group, the organic group comprising a) at least one $C_1$–$C_{12}$ alkyl group, and b) at least one ionic group, at least one ionizable group, or a mixture of an ionic group and an ionizable group, wherein at least one alkyl group of the organic group is directly attached to the carbon black.

20. A composition of claim 19 wherein the ionic or the ionizable group is an ethane sulfonic acid or a salt thereof.

21. A compostion of claim 19 further comprising at least two additives selected from the group consisting of humectants, binders, dyes, biocides, penetrants, and surfactants.

22. An ink jet recording method, comprising the step of:
applying to a recording medium ink droplets discharged from orifices of an ink jet recording head, wherein said ink comprises an aqueous vehicle and a carbon black product having attached at least one organic group, the organic group comprising a) at least one aromatic group, and b) at least one ionic group, at least one ionizable group, or a mixture of an ionic group and an ionizable group, wherein at least one aromatic group of the organic group is directly attached to the carbon black.

23. A method of claim 22, wherein the ink further comprises at least two additives selected from the group consisting of humectants, binders, dyes, biocides, penetrants, and surfactants.

24. An ink jet recording method, comprising the step of:
applying to a recording medium ink droplets discharged from orifices of an ink jet recording head, wherein said ink comprises an aqueous vehicle and a carbon black product having attached at least one organic group, the organic group comprising a) at least one $C_1$–$C_{12}$ alkyl group, and b) at least one ionic group, at least one ionizable group, or a mixture of an ionic group and an ionizable group, wherein at least one alkyl group of the organic group is directly attached to the carbon black.

25. A method of claim 24, wherein the ink further comprises at least two additives selected from the group consisting of humectants, binders, dyes, biocides, penetrants, and surfactants.

* * * * *

UNITED STATES PATENT AND TRADEMARK OFFICE
CERTIFICATE OF CORRECTION

PATENT NO.: 5,571,311
DATED     : November 5, 1996
INVENTORS:   James A. BELMONT, Joseph E. JOHNSON, and Curtis E. ADAMS It is certified that error appears in the above-identified patent and that said Letters Patent is hereby corrected as shown below:

At column 4, line 14, please delete "aromatic" and insert -- alkyl --.

Signed and Sealed this

Eighth Day of June, 1999

Attest:

Attesting Officer

Q. TODD DICKINSON

Acting Commissioner of Patents and Trademarks